Oct. 27, 1959 C. E. G. REEVES Re. 24,730

PORTABLE SIGNALLING DEVICE

Original Filed May 10, 1956 2 Sheets-Sheet 1

INVENTOR
CHARLES E. GRAHAM REEVES
BY
Burgess, Ryan & Hicks
ATTORNEYS

PORTABLE SIGNALLING DEVICE

Original Filed May 10, 1956 2 Sheets-Sheet 2

INVENTOR
CHARLES E. GRAHAM REEVES
BY
Burgess, Ryan & Hicks
ATTORNEYS

United States Patent Office

Re. 24,730
Reissued Oct. 27, 1959

24,730

PORTABLE SIGNALLING DEVICE

Charles E. Graham Reeves, Summit, N.J., assignor to Falcon Alarm Company, Inc., a corporation of New Jersey Original No. 2,840,032, dated June 24, 1958, Serial No. 584,138, May 10, 1956. Application for reissue June 24, 1959, Serial No. 822,697

6 Claims. (Cl. 116—112)

Matter enclosed in heavy brackets [ ] appears in the original patent but forms no part of this reissue specification; matter printed in italics indicates the additions made by reissue.

The present invention relates to signalling devices and relates, more particularly, to a self-powered, portable signalling device.

The present application is a continuation-in-part of my copending application Serial No. 516,090, filed June 17, 1955, now abandoned, entitled Portable Signalling Device.

An object of the invention is to provide self-contained, portable signalling device employing a diaphragm type of horn which is small and inexpensive to manufacture, but which will produce a signal of over 100 decibels for a prolonged period of time when operated at relatively low pressure from a container of vaporizable material such as dichlorodifluoromethane, more commonly known as "Freon-12" which in gas or vapor form has a density greater than air. Another object of the invention is to provide a diaphragm type horn which uses a small diameter diaphragm (less than 2½ inches) which may be operated satisfactorily by a gas of higher density than air.

A further object of the present invention is to provide an inexpensive and efficient signalling device which is self-powered and which is light enough to permit the device to be readily carried about by hand without difficulty. Another object of the invention is to provide a self-powered, portable signalling device that will produce a loud audible signal of considerable duration and which may be controlled as desired by the operator.

A portable signalling device embodying the invention is especially useful as an air raid signal or the like for civil defense purposes in case of power failures and in places where there are no existing signalling systems or where the existing signalling systems cannot be readily heard. In addition, such a signalling device is especially useful for use as a horn on small boats and as an alarm for use in schools or other institutions. Further, the present invention provides a signalling device that does not require any electrical connections or the like for its operation and is therefore safe for use under conditions where there is danger of explosion, as in oil refineries, mines or the like. In addition, the cost of a portable signalling device embodying the invention is much lower than when a conventional signalling device is used under such conditions.

Other objects and advantages of the invention will be apparent and best understood from the following description and the accompanying drawings, in which.

Figures 1, 2:
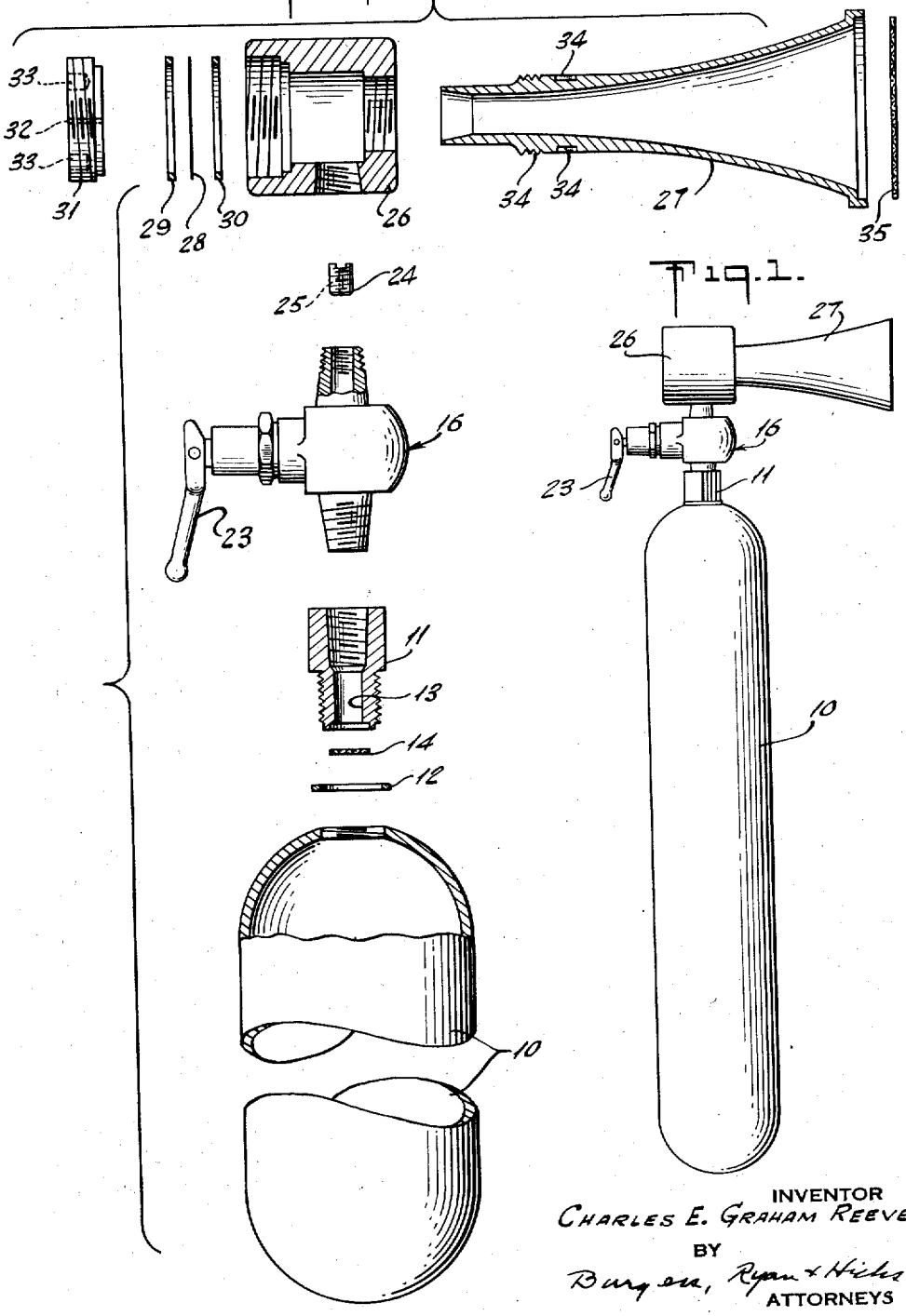
Fig. 1 is a side elevation of a portable signalling device embodying the invention.
Fig. 2 is an exploded view in section of the signalling device illustrated in Fig. 1, but on an enlarged scale.
Figure 3:
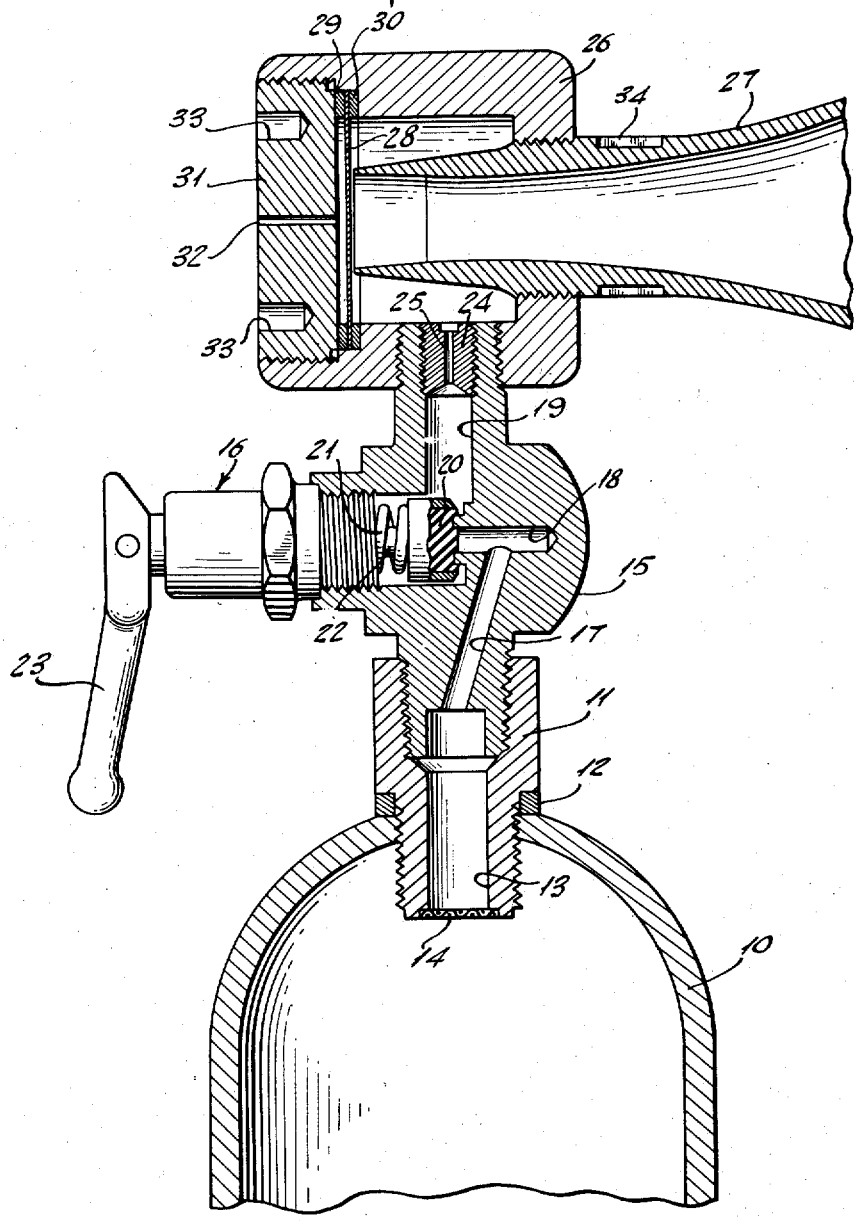
Fig. 3 is a vertical section view of the signalling device illustrated in Fig. 1, but on an enlarged scale.

Referring to the drawings in detail, there is a cylinder 10 which may be made of steel or other suitable material and contains an inert gas having a density greater than the average density of air and which is under sufficient pressure to maintain the gas in liquid form. If desired, the cylinder may be of the throw away type so that when the supply of vaporizable material is exhausted the cylinder may be replaced by the user with a fresh cylinder.

Examples of vaporizable materials which will produce a gas having a density greater than air are the fluorochloromethanes (Freon"). Such materials may be maintained in liquid form at relatively low pressures and hence may be confined in relatively light cylinders or containers. In the case of dichlorodifluoromethane ("Freon–12"), 70 to 80 pounds pressure is sufficient to maintain the material in liquid form at a normal temperature of 70° F. Dichlorodifluoromethane which has a boiling point of —29° C. (—21.6° F.) at one atmosphere has been found to operate the signalling device at temperatures as low as 0° F. In addition, a relatively small quantity of such vaporizable material will supply sufficient gas or vapor at the pressure required to operate a signalling device of the character described herein for a considerable period of time. For example, it has been found in actual use that a cylinder containing about 10 oz. of dichlorodifluoromethane ("Freon-12") will produce a signal of over 100 decibels for five or six minutes duration when operated continuously or approximately three hundred two-second blasts when operated intermittently.

A hexagonal fitting *or coupling* 11 is threaded into an opening in the top of the cylinder 10 and a sealing member 12 is clamped between the outside of the cylinder and a shoulder on the fitting. The fitting may be readily tightened with a wrench to prevent any leakage between the cylinder and the fitting.

The fitting has a passageway 13 extending therethrough and a fine mesh screen 14 covers the lower end of the passageway to prevent solid matter from entering and possibly blocking the passageway. The upper end of the fitting is threaded internally with a slight taper to receive a threaded end of a body or *second fitting* 15 *containing* a manually operable valve 16.

The manually operable valve 16 is of a type that is available commercially and need not be described in detail here. However, it will be noted that the *second fitting or* valve body 15 contains passageways *or conduits* 17, 18 and 19 which provide communication between the passageway in the *first* fitting and the upper end of the valve body. One end of the passageway 18 opens into the valve body and the portion of the valve body surrounding such opening is normally engaged by a resilient washer 20 under pressure from a spring 21 which closes the opening therein. The washer 20 is carried on a plunger 22 which extends outside of the valve body. An operating lever 23 is pivotally connected to the outer end of the plunger and bears against the outside of the valve body. The lever 23 when depressed or raised moves the washer away from the end of the passageway 18 and opens the valve so that the passageway 18 will be in communication with the passageway 19.

The upper end of the passageway 19 in the valve body is internally threaded to receive a plug 24 containing a metering orifice 25. The upper end of the valve body which is threaded externally with a slight taper, is threadably fitted into an opening in housing 26 for a horn 27. When the valve is open, the metering orifice 25 in the passageway 19 controls the flow of gas or vapor under pressure into the housing and enables the signalling unit to operate properly over a wide range of pressures in the cylinder.

The housing 26 has an opening at one end thereof in which a vibratable diaphragm 28 is located with its outer edges being held between a pair of spacing washers 29 and 30. The inner washer 30 is seated against a shoulder in the housing and an end cap 31 which is threadably fitted in the open end of the housing bears against the outer washer 29. The end cap bears against the outer washer 29 which creates a space between the center of the end cap and the diaphragm and this space is vented by a small drilled hole 32 in the end cap to permit the diaphragm to vibrate readily without damping. The washers also serve to seal the outer edges of the diaphragm effectively to the housing. The end cap has recesses 33 in its outer end to receive a spanner wrench which permits the cap to be tightened to form a seal and to hold the edges of the diaphragm firmly in place.

An important feature of the present invention is the discovery that a diaphragm type horn having a diaphragm less than 2½ inches in diameter may be operated by means of a gas of greater density than air, such as dichlorodifluoromethane, more commonly known as "Freon-12," at relatively low pressures to produce an audible signal of satisfactory volume and pitch for use in a signalling device. As previously mentioned, dichlorofluoromethane is a suitable material for use in operating such a diaphragm type horn and in gas or vapor form, it has a density of 5.4 grams per liter as compared with an average density of 1.25 grams per liter for air. Another example of suitable gas is carbon dioxide ($CO_2$) which has a density of 1.96 grams per liter. This not only permits a diaphragm type horn of a size small enough to be used in a self-contained portable signalling device to be constructed, but it also enables such a signalling device to be operated for a considerable period of time from a relatively small container in which a supply of a vaporizable material is maintained in liquid form.

In the example of the signalling device embodying the present invention which is illustrated and described herein, the diaphragm 28 has an overall diameter of only one inch with the clear area between the inner edges of the washers 29 and 30 being 13/16 of an inch in diameter. Despite the small size of this diaphragm, an audible signal having a volume of over 100 decibels is produced at a gas pressure of from 12 to 15 pounds per square inch when the horn is operated by a high density gas such as dichlorodifluoromethane. The diaphragm 28 may be made of stainless steel or other suitable material and may vary in thickness from one to three thousandths of an inch without materially affecting the character of the signal produced.

It is significant to note that a diaphragm horn of these dimensions cannot be operated by air under pressure to produce a satisfactory signal and it has generally been considered impossible or impractical to construct a diaphragm type of horn for operation by air or steam having a diaphragm less than 2½ inches in diameter. Also, in an air operated diaphragm type of horn, a minimum air pressure of 40 pounds per square inch is required to obtain effective sound and, under these conditions, it would obviously be impractical to make a self-contained portable signalling device using air as the source of power.

Thus, the discovery that a horn having a diaphragm of less than 2½ inches in diameter will produce an audible signal of satisfactory volume and pitch when operated by a gas having a density of approximately 1½ to 4 times the density of air leads to unexpected results and advantages. In the first place, it permits the use of a small horn which in turn makes it possible to construct a small and lightweight signalling device that can be carried about in the operator's hand for operation as desired. Further, the fact that such a horn will operate satisfactorily at low pressure makes it possible to operate such a horn over a substantial period of time from a relatively small quantity of vaporizable material.

The horn 27 may be made in one piece and has a threaded section on its outer surface which engages with a threaded opening in the other end of the housing making a tight fit therewith. Slots 34 are provided on the outer surface of the horn to receive a spanner wrench which may be used to seat the horn in the housing.

The inner end of the horn abuts the central portion of the diaphragm and distends the diaphragm slightly. The distension of the diaphragm is such that when the gas or vapor under pressure is admitted to the housing, the diaphragm is forced rearwardly or away from the throat of the horn and permits the gas within the housing to escape through the horn. When the pressure of the gas within the housing drops sufficiently, the diaphragm returns to its original or closed position with the cycle of operation then being repeated and causing the diaphragm to vibrate. The vibration of the diaphragm in this manner acts on the column of escaping gas in the horn and sets up vibrations therein which produce the audible sound or signal.

In the illustrated embodiment of the invention, the metering orifice 25 is approximately .027 inch in diameter. However, it will be understood that the diameter of this opening may be varied without appreciably affecting the operation of the diaphragm or changing the tone of the horn. The orifice regulates the consumption of the gas and reduces the pressure of the gas acting on the diaphragm to the pressure required for the desired operation of the horn.

In operation of the device, the valve 16 is opened by pressing on the lever 23. This permits gas under pressure emanating from the liquid material in the cylinder to flow into the housing 26 at a controlled rate through the metering orifice 25 in the plug 24. The gas under pressure in the housing causes the diaphragm to vibrate at an audible frequency as the gas escapes through the horn. The signal thus produced has a volume of about 100 to 115 decibels and will be loud enough to be heard for a considerable distance. The duration of the signal can be controlled at will by operation of the valve. In a raised position of the lever 23, the valve will remain open for a continuous signal and an intermittent signal may be produced by depressing the lever 28 and then releasing it.

It will be understood that various changes and modifications may be made in the embodiment of the invention described and illustrated herein without departing from the scope of the invention as defined by the following claims.

I claim:

1. A self-powered, portable signalling device comprising a container, a supply of vaporizable liquid in said container, said vaporizable liquid having a density when in vapor form up to four times the density of air and being vaporizable at atmospheric pressure at temperatures as low as −20° F., a fitting removably connected to said container and having a first conduit which communicates with the interior thereof, a housing connected to said fitting, said fitting having a second conduit which communicates with the interior of said housing, a manually operable valve connected to and carried by said fitting, the conduits in said fitting being adapted to communicate with each other upon the opening of said manually operable valve, and a diaphragm-type horn carried by said housing and operatively communicating with said second conduit, the diaphragm of said diaphragm-type horn being substantially circular in shape and disposed in said housing, the diameter of said diaphragm being less than two and one-half inches.

2. A self-powered, portable signalling device comprising a container, a supply of vaporizable liquid in said container, said vaporizable liquid having a density when in vapor form up to four times the density of air and being vaporizable at atmospheric pressure at temperatures as low as −20° F., a fitting removably connected to said container and having a first conduit which communicates with the interior thereof, a housing connected to said fitting, said fitting having a second conduit which communicates with the interior of said housing, a manually operable valve connected to and carried by said fitting, the conduits in said fitting being adapted to communicate with each other upon the opening of said manually operable valve, a diaphragm-type horn carried by said housing and operatively communicating with said second conduit, the diaphragm of said diaphragm-type horn being substantially circular in shape and disposed in said housing, the diameter of said diaphragm being less than two and one-half inches, and a metering device in said second conduit.

3. A self-powered, portable signalling device comprising a container, a supply of liquid dichlorodifluoromethane in said container, a fitting removably connected to said container and having a first conduit which communicates with the interior thereof, a housing connected to said fitting, said fitting having a second conduit communicating with the interior of said housing, a manually operable valve connected to and carried by said fitting, the conduits in said fitting being adapted to communicate with each other upon the opening of said manually operable valve, and a diaphragm-type horn carried by said housing and operatively communicating with said second conduit, the diaphragm of said diaphragm-type horn being substantially circular in shape and disposed in said housing, the diameter of said diaphragm being less than two and one-half inches.

*4. A self-powered signalling device comprising a container, a supply of vaporizable liquid in said container, said vaporizable liquid having a density when in vapor form of between 1.96 and 5.4 grams per liter and being vaporizable at atmospheric pressure at a temperature as low as —20° F., a fitting connected to said container and having a passageway which communicates with the interior thereof, a housing connected to said fitting and communicating with the passageway therein, a manually operable valve connected to and carried by the fitting for controlling the flow of vapor from the vaporizable liquid in the container to the housing through the passageway in the fitting, said valve normally closing said passageway, a vibratable diaphragm mounted in the housing, said diaphragm being substantially circular in shape and being less than two and one-half inches in diameter, and a horn carried by the housing, said horn having an inner end located within the housing in opposing relation to and normally abutting a central portion of the diaphragm.*

*5. A self-powered signalling device comprising a container, a supply of vaporizable liquid in said container, said vaporizable liquid having a density when in vapor form of between 1.96 and 5.4 grams per liter and being vaporizable at atmospheric pressure at a temperature as low as —20° F., a fitting connected to said container and having a passageway which communicates with the interior thereof, a housing connected to said fitting and communicating with the passageway therein, a manually operable valve connected to and carried by the fitting for controlling the flow of vapor from the vaporizable liquid in the container to the housing through the passageway in the fitting, said valve normally closing said passageway, a vibratable diaphragm mounted in the housing, said diaphragm being substantially circular in shape and being less than two and one-half inches in diameter, a horn carried by the housing, said horn having an inner end located within the housing in opposing relation to and normally abutting a central portion of the diaphragm, and a metering device having a restricted orifice located in the passageway between the housing and the container.*

*6. A self-powered signalling device as defined in claim 5 wherein the vaporizable liquid in the container is dichlorodifluoromethane.*

References Cited in the file of this patent or the original patent

UNITED STATES PATENTS

| | | |
|---|---|---|
| 1,898,546 | Kelley | Feb. 21, 1933 |
| 2,778,330 | Jacoby | Jan. 22, 1957 |
| 2,793,651 | Gomez | May 28, 1957 |